(12) United States Patent
Maeda (10) Patent No.: US 7,742,377 B2
(45) Date of Patent: Jun. 22, 2010

(54) IMAGE FORMING METHOD, APPARATUS AND COMPUTER-READABLE RECORDING MEDIUM HAVING IMAGE FORMING PROGRAM

(75) Inventor: Katsuhiko Maeda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 595 days.

(21) Appl. No.: 11/755,865

(22) Filed: May 31, 2007

(65) Prior Publication Data

US 2007/0285677 A1 Dec. 13, 2007

(30) Foreign Application Priority Data

May 31, 2006 (JP) ............................. 2006-151873

(51) Int. Cl.
*G11B 7/00* (2006.01)
(52) U.S. Cl. ..................................... 369/100; 369/44.41
(58) Field of Classification Search .................. None
See application file for complete search history.

(56) References Cited

U.S. PATENT DOCUMENTS 6,803,937 B2 * 10/2004 Hirooka et al. ............. 347/236
2006/0054846 A1 * 3/2006 Satoh et al. ................. 250/587

FOREIGN PATENT DOCUMENTS

JP 2002-096502 4/2002

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

An image forming apparatus at least includes a photoreceptor, a light emitter, a detector and a controller. The light emitter irradiates the photoreceptor with a laser beam so as to form an electrostatic latent image thereon. The detector detects an incident amount of the laser beam falling on a light receiving portion of the detector on a main scan line. The controller changes at least one of a detection sensitivity of the detector for a laser beam and an emission amount of the laser beam emitted from the light emitter when the incident amount of the laser beam detected by the detector is not greater than a predetermined value.

12 Claims, 7 Drawing Sheets

IMAGE FORMING METHOD, APPARATUS AND COMPUTER-READABLE RECORDING MEDIUM HAVING IMAGE FORMING PROGRAM

CROSS REFERENCE TO RELATED APPLICATIONS

This patent application is based on and claims priority under 35 U.S.C. §119 from Japanese patent application No. JP2006-151873, filed on May 31, 2006, in the Japan Patent Office. The entire contents of which are incorporated herein by reference.

BACKGROUND OF THE INVENTION

1. Field of the Invention

Exemplary aspects of the present invention generally relate to a method, an apparatus, and a computer-readable recording medium for image forming, and more particularly to a method, an apparatus, and a computer-readable recording medium for accurately detecting an optical beam emitted to a photoreceptor.

2. Discussion of the Background

Conventionally, in a method for correcting the magnification of an image formed on a photoreceptor when forming an image, laser beams emitted on the photoreceptor are detected by a laser beam detector provided at two places: at a scan start side and at a scan finish side on a main scan line.

Subsequently, a time lag from the time one laser beam detector detects a laser beam to the time the other laser beam detector detects the laser beam is calculated. Based on the calculated time lag, the frequency of a pixel clock is changed so as to adjust the magnification of the image formed on the photoreceptor.

Furthermore, a method of minimizing a number of measurements of the time lag detected by the two laser beam detectors has been proposed.

However, according to related arts, when the laser beam detectors fail to detect the laser beam at the two places, that is, at the scan start side and the scan finish side on a main scan line, the magnification of the image may not be corrected, thereby causing an image deviation. Consequently, a high quality image may not be obtained.

SUMMARY

In view of the foregoing, exemplary embodiments provide a method, apparatus, computer program and a computer-readable recording medium for image forming. An image forming apparatus may include a photoreceptor, a light emitter, a detector, and a controller.

The light emitter irradiates the photoreceptor with a laser beam so as to form an electrostatic latent image thereon. The detector may detect an incident amount of the laser beam falling on a light receiving portion of the detector on a main scan line. The controller may change at least one of a detection sensitivity of the detector for a laser beam and an emission amount of the laser beam emitted from the light emitter when the incident amount of the laser beam detected by the detector is not greater than a predetermined value.

In exemplary embodiments, the detector may detect a positional variation in a sub-scan direction of the laser beam falling on the light receiving portion. The controller may change at least one of the detection sensitivity of the detector for the laser beam and the emission amount of the laser beam emitted from the light emitter based on the positional variation of the laser beam detected by the detector.

In exemplary embodiments, the detector may satisfy the following relationship:

$X+Z>2Y$, where X is a beam diameter of the laser beam falling on the light receiving portion; Z is a width of the light receiving portion in a sub-scan direction; and $\pm Y$ is the positional variation of the laser beam falling on the light receiving portion.

In exemplary embodiments, the image forming apparatus may further include a plurality of the photoreceptors, a plurality of the detectors, and a plurality of the controllers. A plurality of laser beams each having a different color may be irradiated to each of the plurality of the respective photoreceptors in order to form a color image thereon.

Exemplary embodiments provide a method of a detecting step and a controlling step. The detecting step may include detecting an incident amount of the laser beam falling on a light receiving portion on a main scan line. The controlling step may include changing at least one of a detection sensitivity for the laser beam detected in the detecting step and an emission amount of the laser beam emitted from a light emitter when the incident amount of the laser beam detected in the detecting step is not greater than a predetermined value.

In exemplary embodiments, the detecting step may include detecting a positional variation in a sub-scan direction of the laser beam falling on the light receiving portion. The controlling step may include changing at least one of the detection sensitivity for the laser beam detected in the detecting step and the emission amount of the laser beam emitted from the light emitter based on the positional variation of the laser beam detected by the detecting step.

In exemplary embodiments, the detecting step may include detecting to satisfy the following relationship:

$X+Z>2Y$, where X is a beam diameter of the laser beam falling on the light receiving portion; Z is a width of the light receiving portion in a sub-scan direction; and $\pm Y$ is the positional variation of the laser beam falling on the light receiving portion.

In exemplary embodiments, the image forming method may further include a plurality of the irradiating steps of irradiating a plurality of the photoreceptors, a plurality of the detecting steps and a plurality of the controlling steps. A plurality of laser beams each having a different color are irradiated to each of the plurality of the respective photoreceptors in order to form a different color image on each thereof.

Exemplary embodiments provide a computer-readable recording medium. The computer-readable recording medium may include an image forming program product to execute the image forming method of the detecting step and the controlling step.

The detecting step may include detecting an incident amount of the laser beam falling on a light receiving portion on a main scan line. The controlling step may include changing at least one of a detection sensitivity for the laser beam detected in the detecting step and an emission amount of the laser beam emitted from a light emitter when the incident amount of the laser beam detected in the detecting step is not greater than a predetermined value.

Additional features and advantages of the present invention will be more fully apparent from the following detailed description of exemplary embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein.

DETAILED DESCRIPTION OF EXEMPLARY EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Exemplary embodiments of the present invention are now explained below with reference to the accompanying drawings. In the later described comparative example, exemplary embodiment, and alternative example, for the sake of simplicity of drawings and descriptions, the same reference numerals will be given to constituent elements such as parts and materials having the same functions, and the descriptions thereof will be omitted unless otherwise stated.

Typically, but not necessarily, paper is the medium from which is made a sheet on which an image is to be formed. Other printable media is available in sheets and their use here is included. For simplicity, this Detailed Description section refers to paper, sheets thereof, paper feeder, etc. It should be understood, however, that the sheets, etc., are not limited only to paper.

Figure 1:
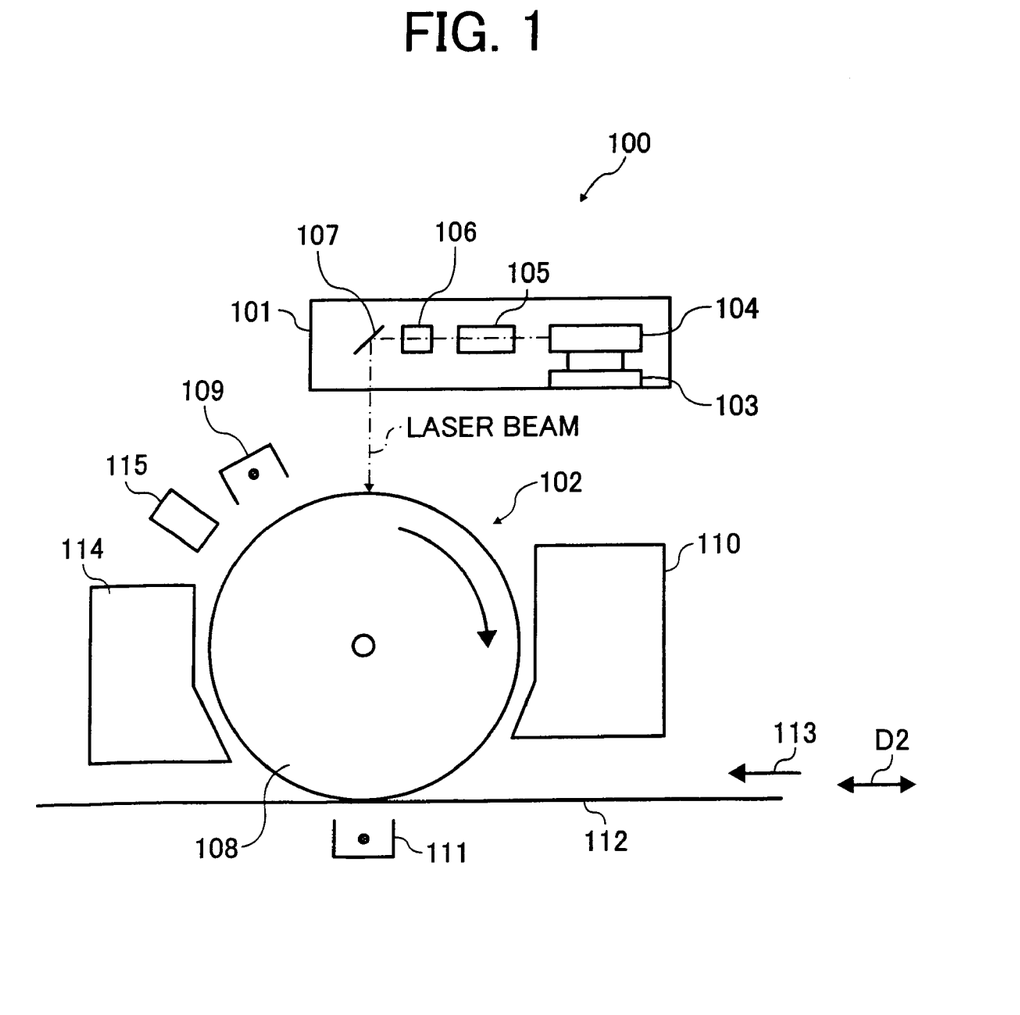
FIG. 1 is a schematic diagram illustrating a structure of an image forming apparatus according to exemplary embodiments of the present invention.

Referring now to the drawings, wherein like reference numerals designate identical or corresponding parts throughout the several views, particularly to FIG. 1, a structure of an image forming apparatus according to exemplary embodiments of the present invention is described.

In FIG. 1, an image forming apparatus 100 may include a laser beam scan unit 101 and an image forming unit 102. The laser beam scan unit 101 may include: a polygon motor 103, a polygon mirror 104, an Fθ lens 105, a Barrel Toroidal Lens (hereinafter referred to as BTL) 106 and a mirror 107.

The image forming unit 102 may at least include: a photoreceptor 108, a charging unit 109, a developing unit 110, a transfer device 111, a transfer belt 112, a recording sheet 113, a cleaning unit 114 and a discharging device 115.

Figure 2:
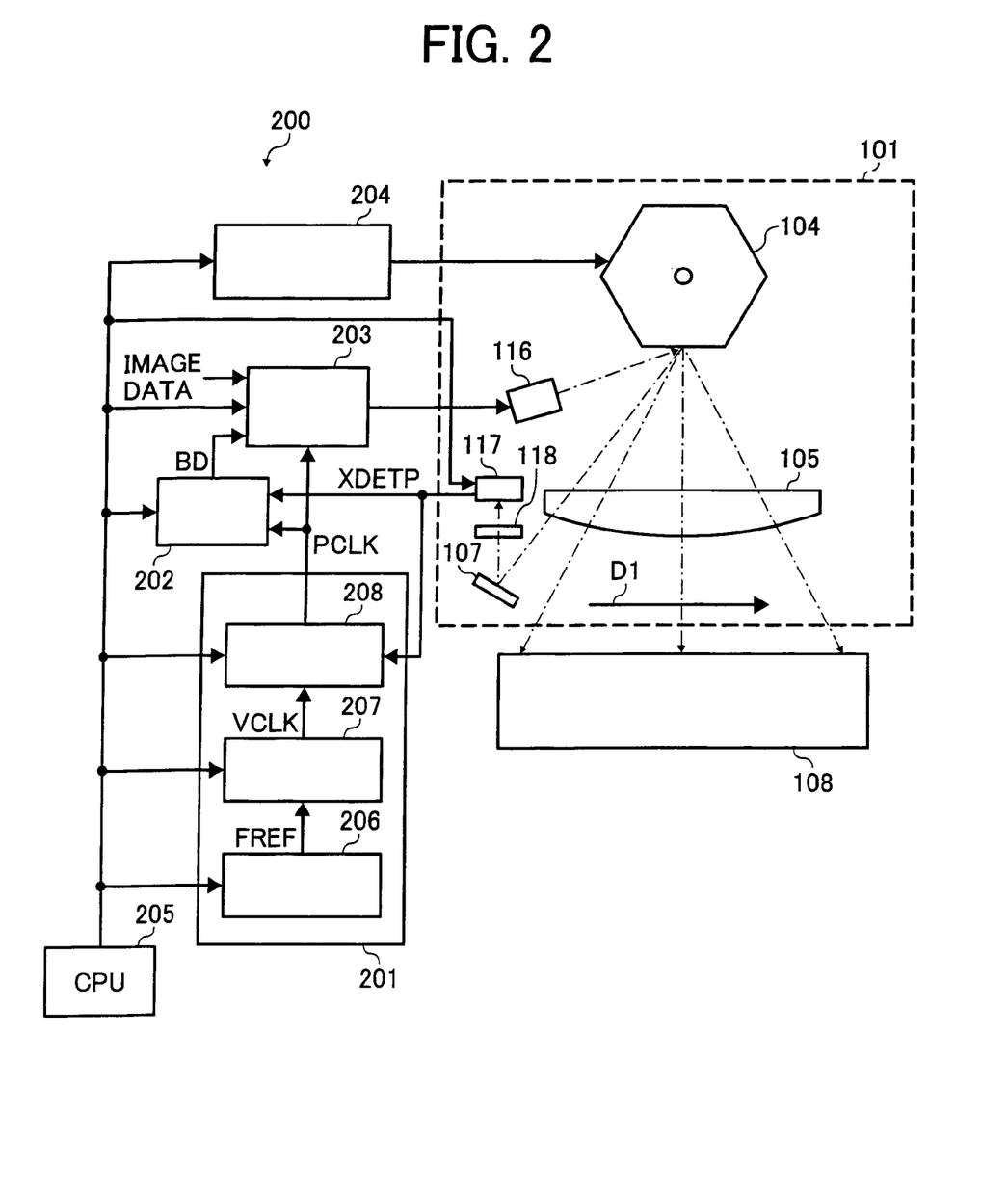
FIG. 2 is a schematic diagram illustrating a structure of an image formation control unit according to exemplary embodiments of the present invention.

In the laser beam scan unit 101, a laser beam emitted from a laser diode (hereinafter referred to as LD) unit 116 serving as a light emitter shown in FIG. 2 is transformed to a parallel light flux by a collimating lens (not shown), passes through a cylindrical lens (not shown), and is deflected by the polygon mirror 104 rotated by the polygon motor 103. Subsequently, the light flux passes through the fθ lens 105 and the BTL 106, is reflected by the mirror 107, and scans over the photoreceptor 108.

The BTL is an abbreviation for Barrel Toroidal Lens which focuses in a sub-scan direction D2. In other words, the BTL achieves the focusing function, and an optical face tangle error is corrected in the subscan direction D2. At the scan start side in the main scan direction D1 is provided a synchronous detection sensor 117 which outputs detection signals each time the laser beam scans.

When forming an image, the circumferential surface of the photoreceptor 108 is evenly charged by the charging unit 109 in the dark. Subsequently, the laser beam emitted from the laser beam scan unit 101 exposes the photoreceptor 108 charged evenly by the charging unit 109. Thereby, an electrostatic latent image is formed on the photoreceptor 108.

The developing unit 110 visualizes the electrostatic latent image by adhering toner so that a toner image is formed.

The transfer device 111 transfers the toner image formed on the photoreceptor 108 onto the recording sheet 113 at a position where the photoreceptor 108 and the recording sheet 113 are in contact. Accordingly, the toner image is formed on the recording sheet 113. Subsequently, a fixing device (not shown) fixes the toner image on the recording sheet 113.

After the toner image is transferred, residual toner on the surface of the photoreceptor 108 is removed by the cleaning unit 114. Subsequently, the photoreceptor 108 is discharged by the discharging device 115 to prepare for the subsequent image formation.

Referring now to FIG. 2, a description will be given of an image formation control unit 200 which controls an image forming operation of the image forming apparatus 100, according to one exemplary embodiment of the present invention.

FIG. 2 is a schematic diagram illustrating the image formation control unit 200 which controls an image forming operation of the image forming apparatus 100. In FIG. 2, the image formation control unit 200 of the image forming apparatus 100 may at least include a pixel clock generator 201, a light controller 202 for synchronous detection, a laser diode (LD) controller 203, a polygon motor controller 204 and a CPU 205.

The pixel clock generator 201 may include a reference clock generator 206, a VCO clock generator 207 and a phase synchronizing clock generator 208. The CPU 205 controls the entire processing of the image forming apparatus 100 which may include the laser beam scan unit 101, the image forming unit 102 and the image formation control unit 200.

At the scan start side in the main scan direction D1 of the laser beam scan unit 101 is provided the synchronous detection sensor 117 which detects a laser beam. The laser beam passing through the fθ lens 105 is reflected by the mirror 107 and is focused by the lens 118.

Subsequently, the laser beam falls on the synchronous detection sensor 117. When the laser beam passes over the synchronous detection sensor 117, the synchronous detection sensor 117 outputs a synchronous detection signal XDETP. The output synchronous detection signal XDETP is then transmitted to the pixel clock generator 201 and to the light controller 202 for synchronous detection.

The pixel clock generator 201 generates a pixel clock PCLK synchronous with the synchronous detection signal XDETP, and transmits the pixel clock PCLK to the LD controller 203 and to the light controller 202 for the synchronous detection.

In order to detect the synchronous detection signal (XDETP), the light controller 202 for the synchronous detection first outputs a forced-lighting signal (BD) for the synchronous detection so that the laser diode is forcibly lit.

After detecting the synchronous detection signal XDETP in the light controller 202, the synchronous detection signal XDETP and the pixel clock PCLK generate the forced-lighting signal BD which may turn on and off without generating a flare light, and may turn on the laser diode LD at a timing that allows the synchronous detection sensor 117 to securely detect the laser beam.

The light controller 202 for the synchronous detection transmits the forced-lighting signal BD to the LD controller 203.

The LD controller 203 controls lighting of the laser diode according to the image data synchronous with the forced-lighting signal BD and the pixel clock PCLK. The laser beam emitted from the LD unit 116 is deflected by the polygon mirror 104, passes through the Fθ lens 105 and scans over the photoreceptor 108.

The polygon motor controller 204 controls the polygon motor 103 at a prescribed number of rotations based on a control signal from the CPU 205.

Figure 3:
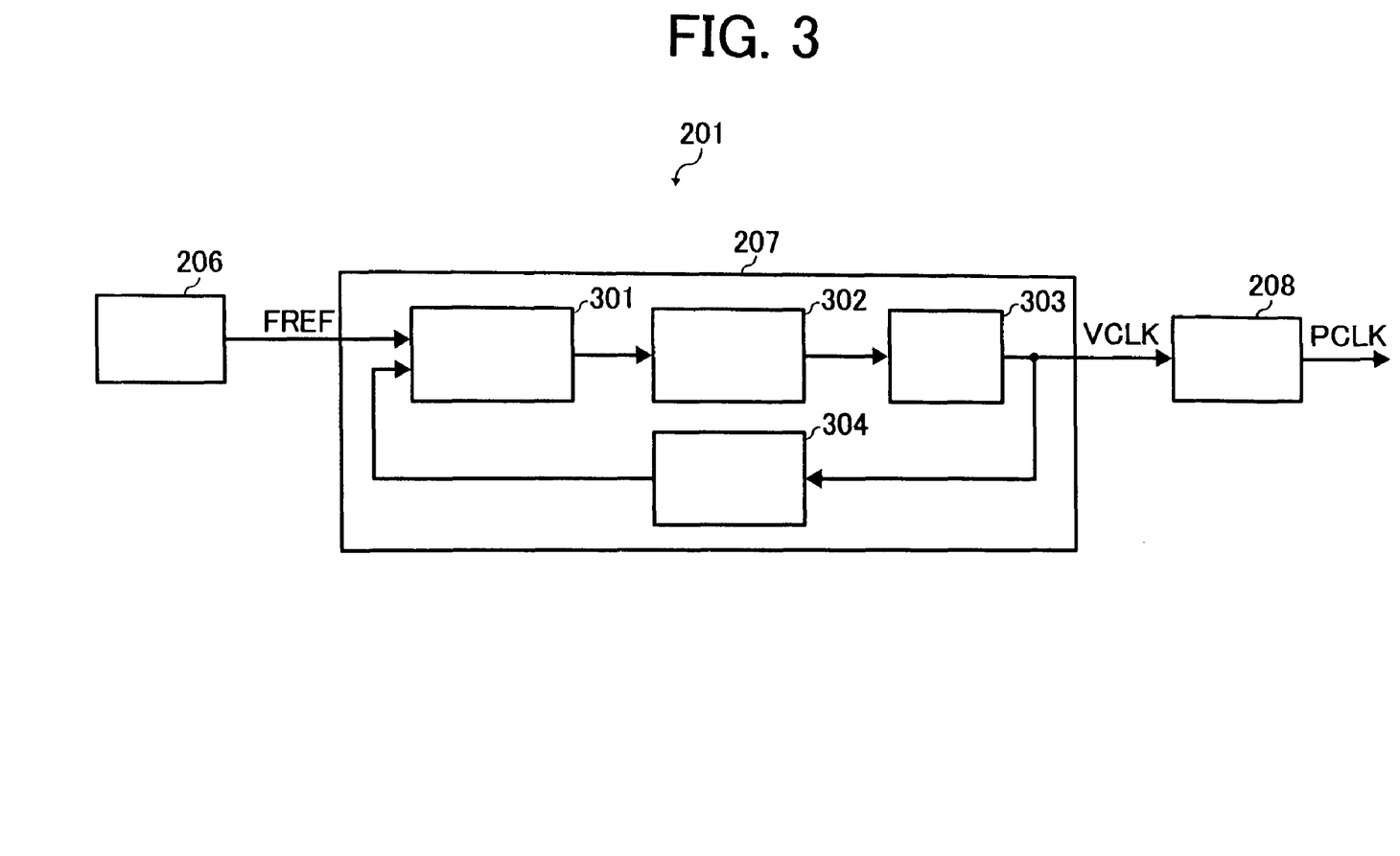
FIG. 3 is a block diagram illustrating a pixel clock generator of the image forming apparatus of FIG. 1 according to exemplary embodiments of the present invention.

Referring now to FIG. 3, a description will be given of the pixel clock generator 201 of the image forming apparatus 100 according to one exemplary embodiment.

FIG. 3 is a block diagram illustrating a Phase Locked Loop (hereinafter referred to as PLL) circuit of the pixel clock generator 201 of the image forming apparatus 100.

In FIG. 3, the reference clock generator 206, a Voltage Controlled Oscillator (hereinafter referred to as VCO) clock generator 207 and the phase synchronizing clock generator 208 may constitute the pixel clock generator 201.

In FIG. 3, a phase comparator 301, a Low Pass Filter (hereinafter referred to as LPF) 302, a VCO 303, and a 1/N frequency divider 304 may constitute the VCO clock generator 207.

In FIG. 3, the VCO clock generator 207 controls the VCO 303 such that a phase difference between a reference clock signal (FREF) output from the reference clock generator 206 and an output signal from the 1/N frequency divider 304 becomes constant.

First, the reference clock signal FREF output from the reference clock generator 206 is input to the phase comparator 301 of the VCO clock generator 207. The phase comparator 301 performs a phase comparison between a phase of the reference clock signal FREF and a comparison signal which is the output signal VCLK from the VCO 303 divided by N by the 1/N divider 304. The component of the phase difference is output to the LPF 302 as a pulsed phase difference signal.

The LPF 302 removes unnecessary high-frequency components and noise from the phase difference signal input from the phase comparator 301, and outputs the phase difference signal to the VCO 303.

Based on the phase difference signal input from the LPF 302, the VCO 303 outputs, to the phase synchronizing clock generator 208, the signal VCLK which is synchronously oscillated at a frequency which is N times the reference clock signal FREF.

Using the PLL circuit as described above, the CPU 205 changes the frequency of the reference clock signal FREF and the frequency dividing ratio N. Accordingly, the frequency of the output signal VCLK from the VCO clock generator 207 may be changed.

The phase synchronizing clock generator 208 generates the pixel clock PCLK synchronous with the synchronous detection signal XDETP from the signal VCLK which is set to a frequency eight times the pixel clock frequency. Therefore, the phase synchronizing clock generator 208 may change the frequency of the pixel clock PCLK in accordance with the change in the frequency of the output signal VCLK from the VCO 303.

Figure 4:
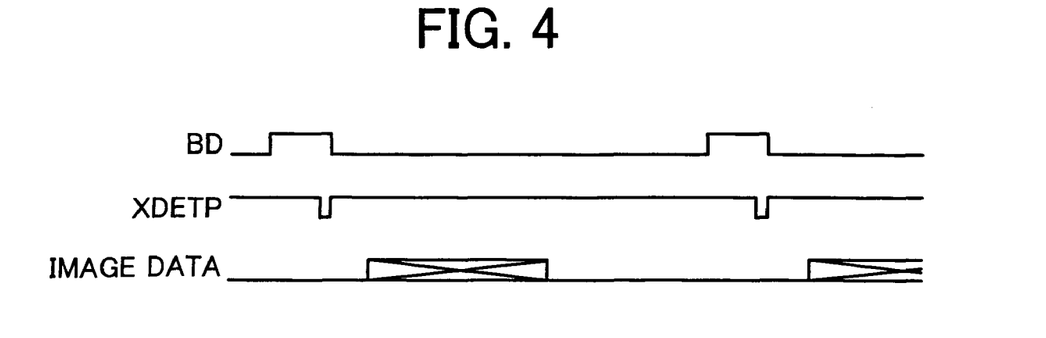
FIG. 4 is a timing chart illustrating a turn-on timing of a laser beam of a laser diode (LD) controller according to exemplary embodiments of the present invention.

Referring now to FIG. 4, a description will be given of a turn-on timing of the laser beam of the LD controller 203 of the image forming apparatus 100 according to one exemplary embodiment of the present invention.

FIG. 4 is a diagram illustrating the turn-on timing of the laser beam of the LD controller 203. In FIG. 4, the LD controller 203 lights up the laser diode upon receiving the forced-lighting signal BD for the synchronous detection. After the synchronous detection sensor 117 outputs the synchronous detection signal XDETP, the laser diode is turned off.

Subsequently, the LD controller 203 controls lighting of the laser diode using image data synchronous with the pixel clock PCLK which is synchronous with the synchronous detection signal XDETP. When the synchronous detection signal XDETP is not output, even if the forced-lighting signal BD has turned on the laser diode, the laser diode may not be lit by the image data.

Next, with reference to FIG. 5, a description will be given of a scan position of the laser beam in a light receiving portion of the synchronous detection sensor 117 of the image forming apparatus 100 according to one exemplary embodiment.

Figure 5:
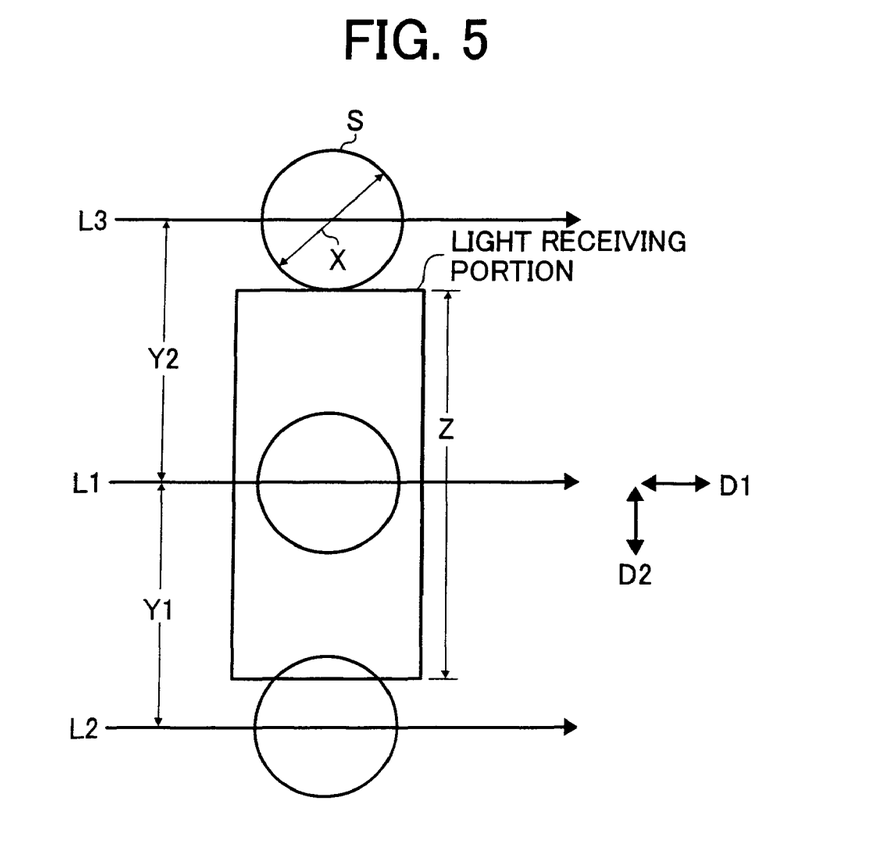
FIG. 5 is a schematic diagram illustrating a scan position of the laser beam in a light receiving portion of a synchronous detection sensor of the image forming apparatus according to exemplary embodiments of the present invention.

FIG. 5 is a diagram illustrating different incident spots of the laser beam which fall on the light receiving portion of the synchronous detection sensor 117, and different scan positions, that is, positional variations of the scan positions of the laser beam which scans the light receiving portion.

In FIG. 5, an incident spot (S) refers to a region or a diameter within which the synchronous detection sensor 117 outputs the synchronous detection signal XDETP when the laser beam falls on the light receiving portion.

As shown in FIG. 5, in a case where the scan position of the laser beam is L1, the laser beam scans the center of the light receiving portion. Therefore, the synchronous detection sensor 117 may output the synchronous detection signal XDETP.

In a case where the scan position of the laser beam fluctuates by an amount Y1 from the position L1 to L2, the laser beam may not scan within the light receiving portion, but it may still scan a portion of the light receiving portion. Therefore, the synchronous detection sensor 117 may output the synchronous detection signal XDTP.

On the other hand, when the scan position of the laser beam fluctuates by an amount Y2 from the position L1 to L3, the laser beam may scan out of the light receiving portion. Therefore, the synchronous detection sensor 117 may not output the synchronous detection signal XDETP. Consequently, the LD may not be lit by the image data.

If, for example, the size of the light receiving portion is predetermined or given, when the fluctuation of the position is relatively large, it may be necessary to expand the incident spot. On the other hand, when the fluctuation of the position is relatively small, the size of the light receiving portion may be reduced.

In light of the above, when Z is a width of the light receiving portion of the synchronous detection sensor 117 in the sub-scan direction D2, X is the diameter of the incident spot S, that is, the diameter of the light flux of the laser beam which falls on the light receiving portion, and ±Y is the positional variation of the laser beam falling on the light receiving portion in the sub-scan direction D2, the relationship between Z, X and Y may be expressed by:

$$X+Z>2Y.$$

Thereby, according to the image forming apparatus 100 of one exemplary embodiment, the laser beam may be securely detected, and no image deviation may be generated. Thus, a high-quality image may be obtained.

Figure 6:
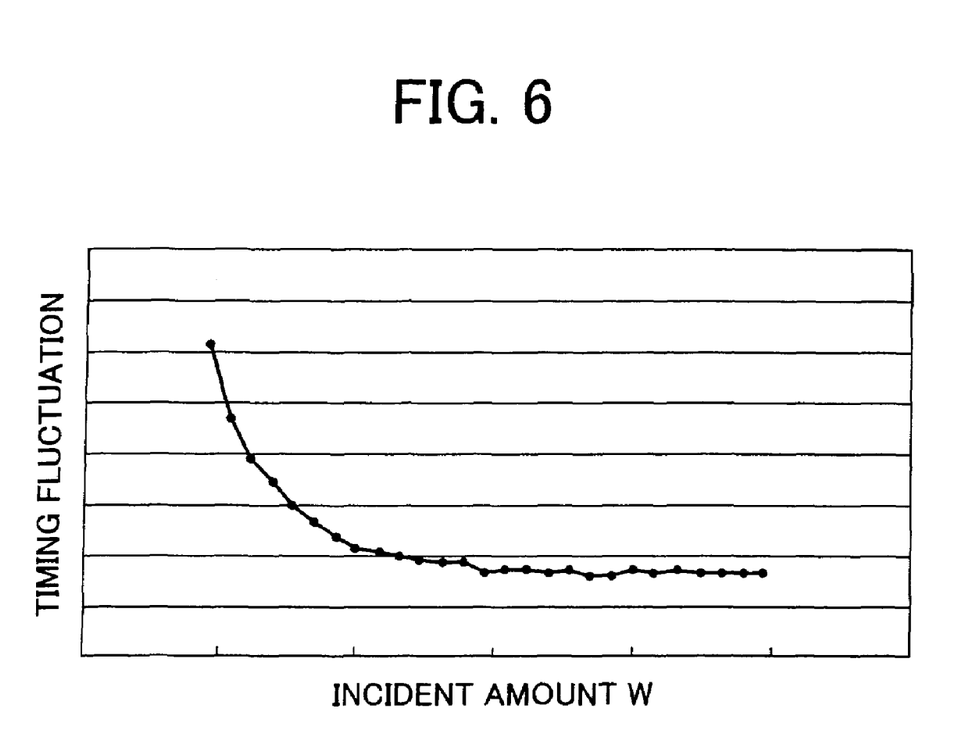
FIG. 6 is a graphical representation of a fluctuation of timing of a synchronous detection signal relative to an incident amount of the laser beam in the synchronous detection sensor according to exemplary embodiments of the present invention.

Referring now to FIG. 6, a description will be given of a fluctuation of timing or jitter of the synchronous detection signal XDETP relative to an incident amount W of the laser beam in the synchronous detection sensor 117 of the image forming apparatus 100 according to one exemplary embodiment of the present invention.

In FIG. 6, when the incident amount W of the laser beam which falls on the light receiving portion of the synchronous detection sensor 117 decreases, the synchronous detection signal XDETP may be output in accordance with the light receiving characteristics, but the timing fluctuation or the jitter when the synchronous detection signal XDETP is output may increase.

As shown in FIG. 5, when the scan position of the laser beam is L2, a part of the incident spot S of the laser beam may be out of the light receiving portion. Consequently, the incident amount of the laser beam which falls on the light receiving portion of the synchronous detection sensor 117 may be less than the incident amount of the laser beam when the scan position of the laser beam is L1.

In such a case, the CPU 205 may regulate the LD controller 203 so that the emission amount of the laser beam may increase when the forced-lighting signal BD for the synchronous detection turns on the laser diode.

Subsequently, the CPU 205 may control the incident amount W of the laser beam which falls on the light receiving portion such that the incident amount W of the laser beam will be the same incident amount of a laser beam when the scan position of the laser beam is L1. Thereby, the deterioration of jitter may be prevented or reduced.

When the maximum positional variation Ymax of the laser beam in the light receiving portion of the synchronous detection sensor 117 is known beforehand, the emission amount of the laser beam may be increased in advance based on the maximum positional variation Ymax of the laser beam so that the jitter characteristics may be improved.

On the other hand, when the maximum positional variation Ymax of the laser beam in the light receiving portion of the synchronous detection sensor 117 is not known beforehand, the positional variation Y of the laser beam may be detected. Subsequently, the emission amount of the laser beam may be changed based on the detected positional variation Y of the laser beam.

In FIG. 2, the CPU 205 may also control the synchronous detection sensor 117 so as to adjust the sensitivity of the synchronous detection sensor 117.

The CPU 205 may change an amplifier gain of the synchronous detection sensor 117 so that optimal jitter characteristics may be achieved even if the incident amount W of the laser beam which falls on the light receiving portion of the synchronous detection sensor 117 is relatively small.

In terms of the amount of change in the sensitivity or the gain of the synchronous detection sensor 117, when the maximum positional variation Ymax of the laser beam is known beforehand, the sensitivity of the synchronous detection sensor 117 may be set to relatively high based on the maximum positional variation Ymax of the laser beam position so that the optimal jitter characteristics may be achieved.

On the other hand, when the maximum positional variation Ymax of the laser beam is not known beforehand, the positional variation Y of the laser beam position may be detected.

Then, the sensitivity of the synchronous detection sensor 117 is changed based on the detected positional variation Y of the laser beam.

Next, with reference to FIG. 7, a description will be given of an exemplary procedure of the processing of the image forming apparatus 100 according to one exemplary embodiment of the present invention.

Figure 7:
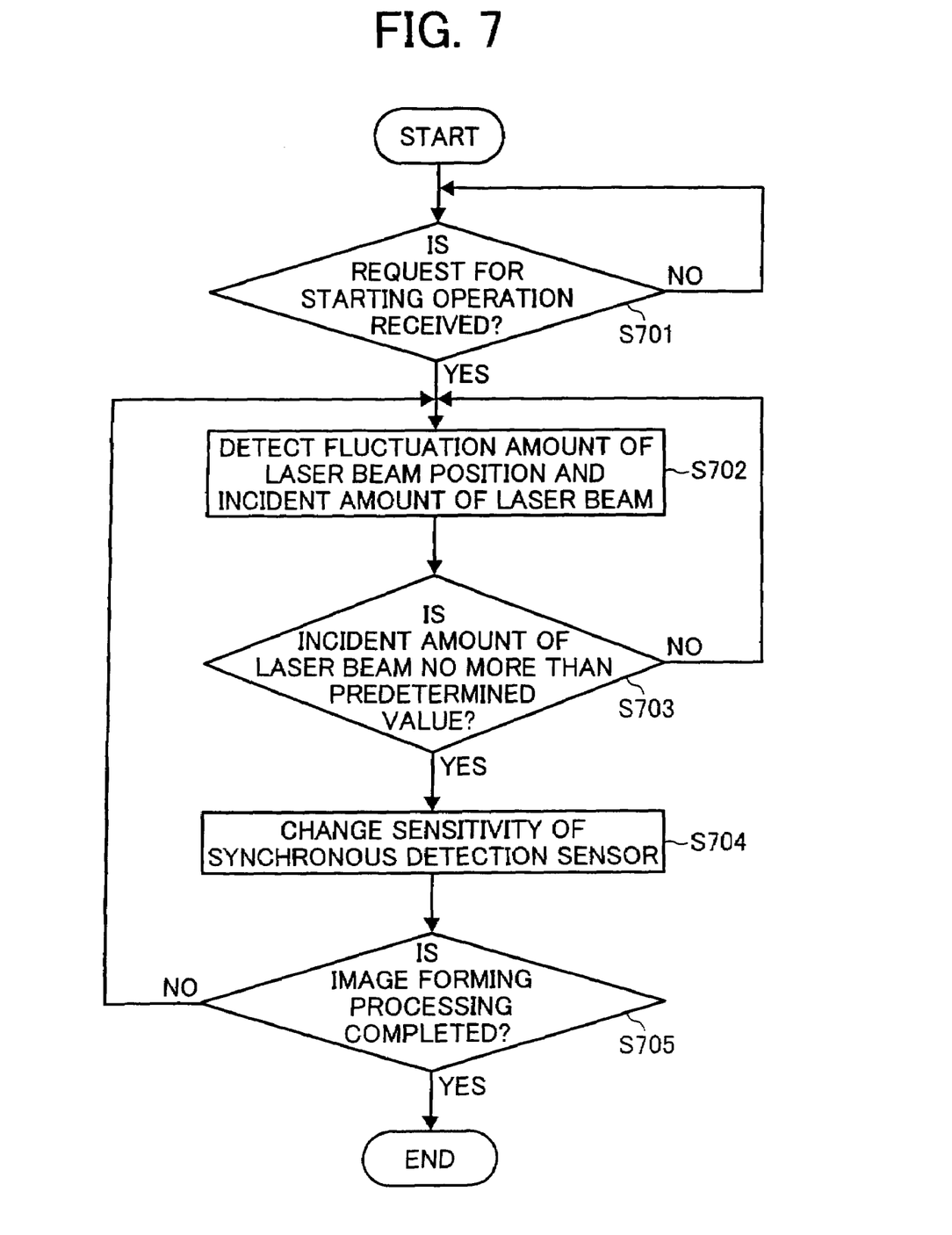
FIG. 7 is a flowchart showing an exemplary procedure of processing of the image forming apparatus according to exemplary embodiments of the present invention.

In FIG. 7, in Step S701, the CPU 205 determines whether or not a request for starting the operation is received. A user may make the request for starting the operation by operating an operating unit (not shown).

When the CPU 205 determines that the request for starting the operation is received (YES in Step 701), the process advances to Step S702 where the CPU 205 detects the positional variation Y of the laser beam which falls on the light receiving portion of the synchronous sensor 117 and also detects the incident amount W of the laser beam.

A two-dimensional CCD sensor provided to the synchronous detection sensor 117 may detect the positional variation Y of the laser beam. The incident amount W of the laser beam may be detected based on an output voltage of a photodiode of the synchronous detection sensor 117.

Subsequently, in Step S703, the CPU 205 may determine whether or not the incident amount W of the laser beam is less than or equal to a predetermined value W0. The predetermined value W0 of the incident amount W of the laser beam may be preset.

When the incident amount W of the laser beam is not less than or equal to the predetermined value W0 (NO in Step S703), the process may return to Step S702, and the CPU 205 may repeat the same process in Step S702.

When the incident amount W of the laser beam is less than or equal to the predetermined value W0 (YES in Step S703), the CPU 205 may change the sensitivity of the synchronous detection sensor 117 in Step S704.

The CPU 205 may set the sensitivity of the synchronous detection sensor 117 to relatively high based on the positional variation Y of the laser beam detected in Step S702, for example. Thereby, the incident amount W of the laser beam which falls on the light receiving portion of the synchronous detection sensor 117 may increase.

Subsequently, in Step S705, the CPU 205 may determine whether or not image forming processing is completed or not.

When the image forming processing is not completed (NO in Step S705), the process may return to Step S702, and the CPU 205 may repeat the same process in Step S702.

On the other hand, when the image forming processing is completed (YES in Step S705), the CPU 205 completes the series of processing.

As described above, the CPU 205 may change the sensitivity of the synchronous detection sensor 117 in Step S704. However, the CPU 205 may change the emission amount of the laser beam emitted from the LD unit 116.

For example, when the forced-lighting signal BD for the synchronous detection turns on the laser diode, the CPU 205 may control the LD controller 203 such that the emission amount of the laser beam may increase according to the positional variation Y of the laser beam which is detected in Step S702.

Accordingly, the incident amount W of the laser beam which falls on the light receiving portion of the synchronous detection sensor 117 may increase.

As described above, the image forming apparatus, the image processing method, the image forming program and the computer-readable recording medium according to one exemplary embodiment may enable the laser beam scan unit to change the sensitivity of the synchronous detection sensor or the emission amount of the laser beam emitted from the LD unit based on the incident amount of the laser beam that is emitted from the LD unit and falls on the light receiving portion of the synchronous detection sensor.

Therefore, the accuracy of the detection of the laser beam by the synchronous detection sensor may be enhanced. When the pixel clock frequency is regulated based on the synchronous detection signal output from the synchronous detection sensor, a high quality image may be formed.

Figure 8:
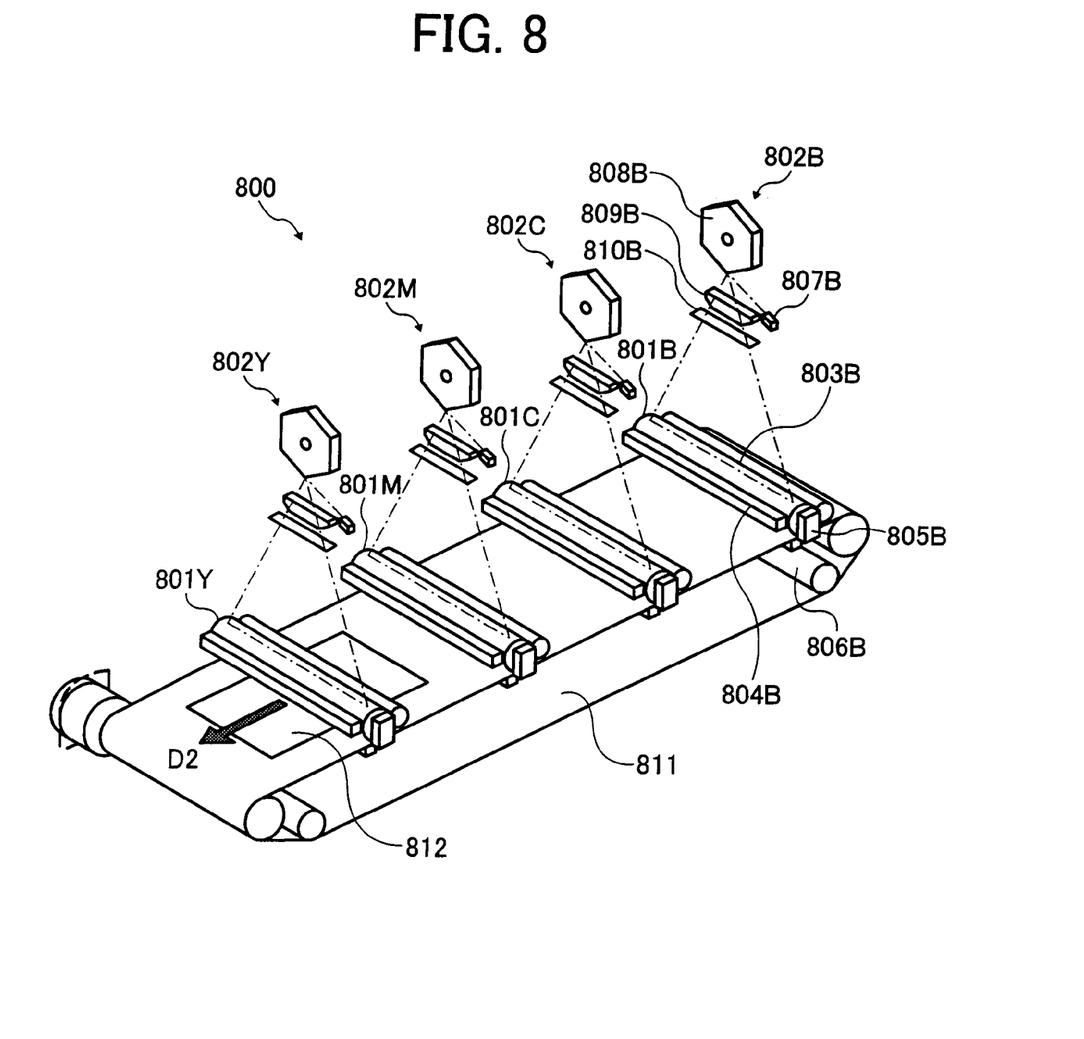
FIG. 8 is a schematic diagram illustrating an image forming apparatus according to another exemplary embodiments of the present invention.

With reference to FIG. 8, a description will be given of an image forming apparatus 800 according to another exemplary embodiment of the present invention.

Referring now to FIG. 8, there is shown a schematic diagram illustrating the image forming apparatus 800. In order to produce a color image by overlaying images of four different colors, yellow (Y), magenta (M), cyan (C), and black (B), the image forming apparatus 800 shown in FIG. 8 may include at least four sets of image forming units 801Y, 801M, 801C and 801B, and four sets of laser beam scan units 802Y, 802M, 802C and 802B.

There is no structural difference among each of the image forming units 801Y, 801M, 801C and 801B, except for the color of the toner images that each image forming unit produces.

Similarly, there is no structural difference among each of the laser beam scan units 802Y, 802M, 802C and 802B of each respective color, except for the colors. Therefore, a description will be given of the image forming unit 801B and the laser beam scan unit 802B for black as a representative example.

In FIG. 8, the image forming unit 801B for black (B) may at least be equipped with a photoreceptor 803B, a charging unit 804B, a developing unit 805B and a transfer unit 806B. The laser beam scan unit 802B for black (B) may at least be equipped with an LD unit 807B, a polygon mirror 808B, an fθ lens 809B and a BTL 810B.

The processing of the image forming unit 801B and the laser beam scan unit 802B may substantially be similar to, if not the same as, the processing of the image forming unit 102 and the laser beam scan unit 101 of the image forming apparatus 100. Thus, the description thereof will be omitted.

The image forming apparatus 800 forms an image in a first color which, in this case, may be black, on a recording sheet 812 being transported in a sub-scan direction D2 by a transfer belt 811. Subsequently, images in different colors of cyan, magenta and yellow are each sequentially transferred on the recording sheet 812. Accordingly, images in four different colors may be overlaid on one another so that a color image may be formed on the recording sheet 812.

The color image on the recording sheet 812 is fixed by the fixing unit (not shown) on the recording sheet 812.

The image formation control unit for each color may be similar to, if not the same as, that of the image formation control unit of the image forming apparatus 100. Therefore, the description thereof will be omitted.

Next, a description will be given of the processing of the image forming apparatus 800 according to another exemplary embodiment of the present invention.

In the case of a color image forming apparatus, jitter in the synchronous detection signal may cause color drift and/or a mottled appearance. Therefore, the processing which the image formation control unit 200 of the image forming apparatus 100 of exemplary embodiments performs may independently be applied to each of the image forming units of different colors.

Thereby, the jitter characteristics of the synchronous detection sensor in the laser beam scan units 802Y, 802M, 802C and 802B of the image forming apparatus 800 may improve.

As described above, the image forming apparatus, the image processing method, the image forming program and the computer-readable recording medium according to the exemplary embodiments may enable the laser beam scan unit to change the sensitivity of the synchronous detection sensor or the emission amount of the laser beam emitted from the LD unit based on the incident amount of the laser beam emitted from the LD unit that falls on the light receiving portion of the synchronous detection sensor.

Accordingly, the accuracy of the detection of the laser beam by the synchronous detection sensors for each respective color may be enhanced. Thus, when the pixel clock frequency is regulated based on the synchronous detection signal transmitted from the synchronous detection sensors for each respective color, a high quality color image may be formed.

In addition, the image forming method according to the exemplary embodiments may be realized by executing a given program read by a computer such as a personal computer (PC) or a workstation.

The program may be stored in a computer-readable recording medium such as a hard disk, a flexible disk, a CD-ROM, a magneto optical disc (MO), a DVD and so forth. The program may be executed when the computer reads out the program from the recording medium.

The program may be a transmission medium which may be distributed by way of a network, i.e. the Internet.

The image forming apparatus, the image processing method, the image forming program and the computer-readable recording medium according to the exemplary embodiments may be useful for a digital copier which may perform multiple tasks for example: copying, facsimile, printing and so forth. It may be suitable for a copier which reads and prints a document.

However, the exemplary aspects of the present invention are not limited to the specific terminology so selected.

One or more embodiments of the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

One or more embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods, when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body.

Examples of a built-in medium include, but are not limited to, rewriteable non-volatile memories, such as ROMs and flash memories, and hard disks.

Examples of a removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus, comprising:
   a photoreceptor;
   a light emitter configured to irradiate the photoreceptor with a laser beam so as to form an electrostatic latent image thereon;
   a detector configured to detect an incident amount of the laser beam falling on a light receiving portion of the detector on a main scan line; and
   a controller configured to change at least one of a detection sensitivity of the detector for a laser beam and an emission amount of the laser beam emitted from the light emitter when the incident amount of the laser beam detected by the detector is not greater than a predetermined value.

2. The image forming apparatus according to claim 1, wherein
   the detector is configured to detect a positional variation in a sub-scan direction of the laser beam falling on the light receiving portion; and
   the controller is configured to change at least one of the detection sensitivity of the detector for the laser beam and the emission amount of the laser beam emitted from the light emitter based on the positional variation of the laser beam detected by the detector.

3. The image forming apparatus according to claim 2, wherein the detector is configured to detect whether the following relationship is satisfied:

$$X+Z>2Y$$

wherein X is a beam diameter of the laser beam falling on the light receiving portion; Z is a width of the light receiving portion in a sub-scan direction; and ±Y is the positional variation of the laser beam falling on the light receiving portion.

4. The image forming apparatus according to claim 1, further comprising:
   a plurality of photoreceptors;
   a plurality of detectors; and
   a plurality of controllers;
   wherein a plurality of laser beams each having a different color is irradiated to each of the plurality of photoreceptors in order to form a color image thereon.

5. An image forming method, comprising:
   irradiating a photoreceptor with a laser beam to form an electrostatic latent image thereon;

detecting an incident amount of the laser beam falling on a light receiving portion on a main scan line; and changing at least one of a detection sensitivity for the laser beam and an emission amount of the laser beam emitted from a light emitter when the detected incident amount of the laser beam is not greater than a predetermined value.

6. The image forming method according to claim 5, further comprising:

detecting a positional variation in a sub-scan direction of the laser beam falling on the light receiving portion; and changing at least one of the detection sensitivity for the laser beam detected in the detecting step and the emission amount of the laser beam emitted from the light emitter based on the positional variation of the laser beam detected by the detecting step.

7. The image forming method according to claim 6, further comprising:

detecting whether the following relationship is satisfied:

$$X+Z>2Y$$

wherein X is a beam diameter of the laser beam falling on the light receiving portion; Z is a width of the light receiving portion in a sub-scan direction; and ±Y is the positional variation of the laser beam falling on the light receiving portion.

8. A computer-readable medium including computer-executable instructions wherein the instructions, when executed by a processor, cause the processor to perform the image forming method of claim 7.

9. A computer-readable medium including computer-executable instructions wherein the instructions, when executed by a processor, cause the processor to perform the image forming method of claim 6.

10. The image forming method according to claim 5, further comprising:

irradiating a plurality of the photoreceptors;

a plurality of detecting an incident amount of the laser beam falling on a light receiving portion on a main scan line; and a plurality of changing at least one of a detection sensitivity for the laser beam and an emission amount of the laser beam emitted from a light emitter when the detected incident amount of the laser beam is not greater than a predetermined value;

wherein a plurality of laser beams each having a different color are irradiated to each of the plurality of the photoreceptors in order to form a different color image on each thereof.

11. A computer-readable medium including computer-executable instructions wherein the instructions, when executed by a processor, cause the processor to perform the image forming method of claim 10.

12. A computer-readable medium including computer-executable instructions wherein the instructions, when executed by a processor, cause the processor to perform the image forming method of claim 5.

* * * * *